Oct. 24, 1944.   C. G. GILBERT ET AL   2,361,092
FILTER UNIT, AND PROCESS OF MAKING SAME
Filed Jan. 25, 1941
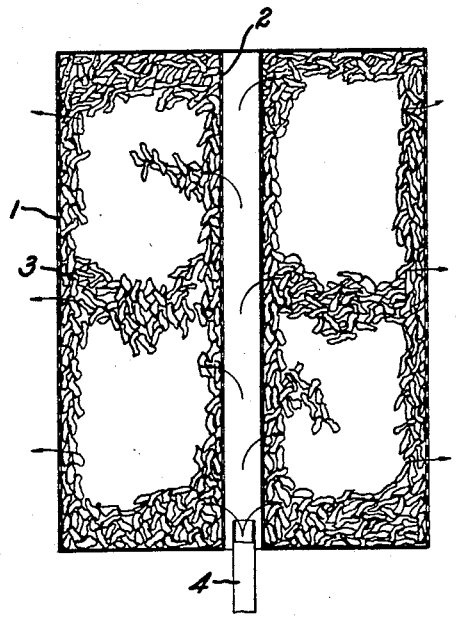
Inventor:
Chester G. Gilbert and
Geoffrey Gilbert,
By Pierce & Scheffler
their Attorneys.

Patented Oct. 24, 1944

2,361,092

UNITED STATES PATENT OFFICE 2,361,092

FILTER UNIT AND PROCESS OF MAKING SAME

Chester G. Gilbert and Geoffrey Gilbert, Laurel, Md., assignors to Gilbert Process Corporation, Laurel, Md., a corporation of Delaware Application January 25, 1941, Serial No. 375,998

5 Claims. (Cl. 210—204)

This invention relates to filters, and is concerned with the production of improved filtering media for use in oil filters adapted to be interposed in the pressure lubricating systems of automobile engines, airplane engines, and like prime movers.

The sludge-forming impurities that develop and accrue in the lubricating oil of an automobile or other internal combustion engine include carbon particles, heavy hydrocarbons and acidic compounds along with atmospheric dust. Up to a certain concentration impurities remain in a state of dispersion in the oil, but with increasing concentration they tend to aggregate into the tarry consistencies known as sludge. The problem of filtration is therefore the problem of providing catchment for impurities which in one form of sludge will clog anything short of a wide open porosity and in the form of a dispersion would pass anything short of an exceedingly fine porosity. Along with this there are other considerations which have to be taken into account, including:

1. *Rate of flow.*—This, of course, varies with the spacial limitations in each type of mounting but a flow at the rate of around a gallon per minute per square foot of overall area with a pressure differential of ten pounds would be a minimum requirement in most connections.

2. *Clogging.*—Similarly, the pressure differential available to maintain flow usually is less than fifteen pounds to the inch. This is insufficient to dissociate the sludge emulsification. Accordingly a porosity fine enough to stop the impurities or even the sludge aggregates as such will coat over, stop up and cut off the flow altogether. Surface catchment, accordingly, is out of the question. This is everywhere recognized, and the uniform practice is to employ depth filtration in one or another form designed to absorb the sludge in transit. Even here the sludge must be left free to pass through the filter along with the oil except insofar as it is absorbed, since positive stoppage of the sludge as such means stoppage of flow. The uniform practice therefore is to depend upon recirculation and progressive abstraction. In this type of filtration effectiveness depends not at all on the positive stoppage of the impurities but upon the relative affinity, by which is here meant the relative capacity to pick up and hold the sludge-forming impurities in component form.

3. *Dumping.*—Inasmuch as the filtration results from attachment rather than positive stoppage, the filter body must retain its load of impurities, once it has picked them up, through changing conditions (including sudden fluctuations in the pressure of the system, e. g., the sudden drop in pressure occasioned by sudden deceleration of the motor). Different agencies vary not only in their capacity to abstract the impurities, but in their ability to retain them as well. Capacity to pick up does not necessarily carry assurance of ability to retain, and a filter that progressively picks up a load only to let it loose in quantity is worse than none at all.

4. *Packing, channeling.*—The pressure in the oil system varies with the acceleration of the engine, and in the case of automobiles in particular the oil pressure comes in the form of pulsations. Unless the filter body is sufficiently rigid to withstand sudden pressure jolts of as much as thirty pounds to the inch and even more in the case of older makes, progressive packing is bound to take place. The compression may be in the direction of flow causing stoppage, or at right angles opening up channels which destroy the functioning of the filter and may even cause loss of pressure in the lubricating system.

5. *Temperature factor.*—In most connections, notably that of the automobile, a filter mounted as an adjunct to the engine is cold at the starting, and depends upon the flow of oil as it circulates and warms up. Movement through the by-pass to the filter calls for movement of the cold oil through the filter. Bearing in mind the temperatures to which a motor car is exposed in the winter months, it will be seen that if a filter is to function reliably, along with admitting of the free passage of sludge as explained earlier, it must admit of the movement of oil through it when chilled to winter temperatures.

It is an object of the present invention to provide a filtering medium meeting the above-recited requirements inherent in oil filters for the pressure lubricating systems of automobile engines, airplane engines, and the like. Another object of the invention is the provision of a process of preparing such filtering media.

In essence, the filtering medium of the present invention consists essentially of relatively loose bodied masses of fibrous material, of the nature of corduroyed cellulose wadding and cotton waste, suitably compacted into a unitary body or aggregate, the individual components of the masses being impregnated with an oil-wettable and structurally porous adsorbent mineral gel (hereinafter more specifically defined), produced in situ in and upon the individual fibers constituting the masses, said mineral gel being present in an amount sufficient to provide body strength against the oil pressures to be encountered but insufficient to render the components stony or non-adsorptive to carbon particles, and the density of pack of the masses in the unitary body being sufficiently loose to permit free flow of the oil together with its associated impurities and being equivalent to from 0.12 ounce to 0.24 ounce of the treated material per one cu. in.

Inasmuch as one of the main functions of the gel is to impart rigidity to the cellulose form without destroying the porosity, the ratio of gel to cellulose necessarily varies with the type and texture of the paper or other cellulose form and also with the form of gel employed. Accordingly, the ratio of gel to fibrous material necessarily takes in a wide range. The proportion of adsorbent mineral gel in the final product ranges between 30% and 75% by weight in the case of corduroyed cellulose wadding and between 5% and 35% by weight in the case of cotton waste.

In its specific embodiment, the filtering medium of the invention consists essentially in a mass of cuttings of corduroyed cellulosic wadding which have been somewhat stiffened with an oil-wettable and structurally porous adsorptive mineral gel stiffening agent produced in situ in and upon the individual fibers constituting the clippings.

By "cellulosic wadding" is here meant self-supporting laminated sheets composed of a plurality of individually fragile webs of relatively loosely felted and unsized cellulosic fibers of papermaking types. In its preferred form, the laminated sheet has been compression embossed along spaced lines or at spaced points, this spaced point compression embossing of the laminated sheet serving to "tack" the plies together sufficiently to maintain the plies together during handling. The term specifically excludes papers such as printing and writing and wrapping grades of paper.

By the expression "cuttings" is here meant strands or small bits severed from the corduroyed cellulosic wadding aforesaid by a shearing operation (e. g., severed by means of shears or knives), and having relatively sharply defined edges; the expression specifically excludes shreds, or small bits of said material produced by a tearing operation, having no sharply defined edges and being less dense at the zones of severance than in the body of the material. Preferably, the cuttings are sheared strands of 12 to 18 ply corduroyed cellulose wadding, about one-eighth to one-fourth inch wide and from one to three (or four) inches long.

The "stiffening" component of the combination is an adsorbent inorganic (mineral) gel, e. g., aluminum hydroxide gel, silica gel, or the like, produced in situ in the clippings. The stiffening component: (1) adheres well to the fibers of the clippings so that no—or only an infinitesimal amount of—movement of solids from the filter mass into the oil stream takes place; (2) protects the fibers of the clippings from water, preventing the pulping down of the same; (3) provides a strengthening structure within the clippings, whereby the combination is able to withstand the varying compressive force of the oil without substantial diminution in apparent volume; and (4) more importantly, itself contributes to the filtration by functioning as an adsorbent for acids and other undesirables to be found in the lubricating oil during use of the latter.

It has been found that it is not enough merely to associate a mass of the pre-formed stiffening agent with the clippings, or with the pulp from which the cellulose wadding is formed, since it is a fact that in the resulting combination the particles of stiffening agent are "fugitive" (which term is here employed as the antithesis of "well anchored" or "firmly secured" to the fibers): the stiffening agent must be formed in situ in and among the fibers constituting the cuttings in order that the desirable adherence is insured.

For preparing the filtering agent from the aforesaid wadding, it is preferred to proceed as follows: The cuttings of corduroyed cellulose wadding are, as uniformly as possible, treated with a solution or liquid preparation of water glass or an aluminum salt (e. g., the sulphate or the chloride) from which the ultimate stiffener can be produced by reaction of said chemical with a suitable reactant, care being taken to minimize the massing or pulping of the cuttings. The so-treated cuttings are then subjected to a mild yet thorough treatment with a chemical (e. g., dilute hydrochloric acid in the case of water glass, or ammonia in the case of the aluminum salt) adapted to react with the chemical used as the impregnant to produce, in and among the fibers of the cuttings, an insoluble precipitate of the desired colloid gel. The reaction may, in general, be effected by showering or sprinkling the impregnated cuttings onto the surface of a body of liquid containing the suitable reactant and allowing them freely to settle through the body of liquid and to remain in contact with the latter for a suitable period of time. Thereafter, the cuttings are separated from the liquid, washed with water, dried and thermally conditioned.

In treating the cuttings with the chemical in liquid state, it is preferred to sprinkle or atomize the liquid by portions onto a mass of the cuttings, while continuously turning over the mass of the cuttings to present untreated surfaces to the spray or mist of treating liquid. In this way the cuttings can be made to take up the desired amount of chemical without becoming "mushy" and without losing their identity as separate objects. By showering the treated cuttings onto the surface of a body of liquid containing the reactant and allowing the cuttings to settle freely therethrough it has been found that the desired reaction takes place throughout the whole cutting but that the cutting does not fall to pulp or become altered as to its structure or shape or apparent volume.

In forming a filter unit from the so-prepared filtering material, the latter is packed into a foraminous basket or container, under a pressure which is a function of the oil pressure to which the filter unit is to be subjected in use, viz., under a pressure of 15 to 20 pounds per square inch in the case of a filter unit adapted for use in the lubricating oil system of an automobile engine operating under a 15–20 pound pressure. In the latter case, this pack gives in use about a five-pound pressure drop to the circulated lubricating oil. Were the compression of the filtering material to exceed materially the working pressure of the oil, the filtering efficiency of the filter unit would be depreciated because of unnecessary compression and breaking down of the structures. The foraminous container chosen for this service is one which cooperates with the particular oil filter casing in which the same is to be employed. Preferably the foraminous container is in the form of a cylinder having imperforate top and bottom, and is provided with a foraminous central core; the central core cooperates with that portion of the filter casing into which lubricating oil under pressure is introduced. In such combination the movement of the oil is radially outward from the center toward the periphery of the filter unit.

The invention will now be described in greater particularity with reference to the following illustrative examples.

Example I

Onto 100 parts by weight of cellulose wadding clippings there was gradually sprinkled an amount of dilute water glass sufficient to yield 100 parts (dry weight) of silica gel, the clippings being continuously lifted and moved about ("tedded") throughout the period of application of the water glass. The impregnated clippings were then sprinkled upon the surface of a body of an aqueous solution of mineral acid (dilute hydrochloric acid, 1 part commercial HCl to about 7 parts of water), through which they fell freely and in which they were allowed to remain for a ripening period. Thereafter, the clippings were removed from the acid solution, were washed free from acid, were dried, and finally were subjected to a baking treatment at about 105° C.

The baking could have been expedited by employing higher temperature but the strength of the fibers of the cuttings would to some extent have been weakened.

The baked product has the appearance and physical properties of the original (untreated) cuttings: the individual strands are flexible and pliable; the fibrous structure is intact; and the apparent volume is the same. However, the baked product does not (as does the untreated material) become "mushy" or lose apparent volume after considerable contact with water-containing lubricating oil under pressure.

Example II

A readily sprayable aqueous solution of water glass was sprayed onto cuttings of corduroyed cellulose wadding, by portions, with continuous tedding of the cuttings, the total amount of solution used being sufficient ultimately to develop 5 ounces of silica gel per 1 pound (dry weight) of cuttings. The so-impregnated cuttings were showered upon the surface of, and allowed freely to settle through, a body of reactant solution prepared as follows: The sodium content of the above impregnating agent was determined, and its chemical (that is, reactive) equivalent of aluminum sulphate was calculated; an amount of aluminum sulphate corresponding to a slight excess over that equivalent amount was dissolved in enough water to provide a body of solution of sufficient volume to immerse the volume of impregnated cuttings. The cuttings were allowed to remain in the aluminum sulphate solution for about 15 minutes, after which time they were removed from the bath, drained, washed with a weak aqueous solution of ammonium hydroxide, washed with water until the washings showed no test for alkali, dried, and baked at about 105° C.

As a result of this treatment, silica gel and alumina gel were homogeneously co-precipitated in amounts to develop 6 ounces of total mineral gel per 1 pound of cuttings (that is to say, 5 ounces of silica gel and 1 ounce of alumina gel). The practical results included the following: The treated product was physically stronger than was the product from Example I, because the fibers of the wadding had not been subjected either to strong acid or strong alkali. This product was an improvement over the product of Example I from the standpoint of "fastness" of the precipitate.

As will be understood, the upper and lower limits of addition of stiffening agent are dependent upon the character of the fibrous cellulosic material (cotton waste, cellulose wadding cuttings, and equivalents) employed, and upon the conditions to be encountered in any particular relation. As a general rule, the more open the structure of the fibrous cellulosic material the higher the percentage of stiffening agent should be added. The upper limit, in practice, may be the limit of holding capacity (i. e., retention of stiffening agent) of the wadding cuttings—or equivalent—while the practical lower limit is the point equivalent to pulping or permanent densification of the composite structure.

In the case of the product typified by Example I, the operable range of stiffening agent lies between about 30% and about 75%, with the optimum at about 50% by weight. In the case of the product typified by Example II, the range of stiffening agent is between 10% and 40% by weight of silica gel, with the percentage of alumina gel being a function of the silica gel: broadly considered, the combined gels are present in an amount between about 12% and 50% by weight of the total weight of the dried product.

The product of the present invention is sharply distinguished from compositions consisting essentially of cellulosic fibers commingled with preformed stiffening agents such as kaolin, paper clay, bauxite, barium (or calcium, or lead) sulphate, and the like, in a number of respects including adherence of the stiffening agent to the fibers. Thus, it has been found that the fibers of cuttings from sheeted "waterleaf" paper containing a loading of kaolin (or paper clay, or bauxite) added to the beaten pulp from which the waterleaf paper was formed are not protected against water, and that such cuttings promptly become pulpy and permanently densified when held in contact with oil containing water; moreover, such cuttings lose their loading of stiffening agent to the oil during use.

The treatments of cellulose wadding described under Examples I and II above improve both the rate and the extent of clean up of fouled lubricating oil at least about ten fold. Thus, with the filter material of the present invention one can purify in 2 hours an amount of fouled oil which the untreated wadding per se would require 20 hours to pass, and with better clean up.

A specific filter unit, using the treated cuttings above described, particularly adapted for use in the recirculatory lubricating oil system of a pleasure automobile was constituted as follows, reference being had to the appended drawing: The container 1 was a perforated can 4.25 inches tall and 4.25 inches in diameter, provided with an axially disposed perforated core 2, which was 0.75 inch in diameter. Into the space 3 between core and periphery there were packed 8.75 ounces of the product of Example I above, under a compression of about 15 pounds per square inch. This unit was so arranged in an automobile filter having a conventional inlet 4 in the center of the bottom thereof, that said filter inlet communicated with the interior space of the core of the unit. At pressures normal to automobile engine systems (15 to 20 pounds gauge), there was obtained a flow, through this packing, at normal working temperatures (±75° C.) of approximately 1 quart per minute, with a pressure drop of about 5 pounds. After exhaustion of the packing of this unit the latter was inspected; it was found that the entire mass (of filling) was relatively uniformly polluted with sludge and associated impurities.

A substantial increase in the density of the packed material (e. g., 12 ounces of the material in the space defined) gave an initial pressure drop of about 8 pounds at the requisite flow of 1 quart per minute, which pressure drop shortly increased to 10, 12, 15 pounds, and to a point where no lubricating oil passed through the filtering material. Inspection of the too densely packed unit showed that the entrant surface layer of the filling was thickly coated with sludge while the remainder of the body of filling contained little or no sludge (or other impurities), thus indicating that there had been but little penetration of sludge into the body of filling.

It was found that if the filling was reduced to 7 ounces (instead of 8.75 ozs.), the pressure drop was much lower (only about 1 pound); at the outset of use, rapid filtration (pick-up of sludge) was had, but thereafter there was incomplete filtration and fouled oil passed through the filling without color change.

These circumstances establish that the present invention relies upon surface phenomena of the mineral gel-carrying fibrous material rather than upon a mechanical screening effect.

Illustrative of a filter unit found to be operable in an airplane engine is the following: The container was a cylindrical can 9 inches in diameter and 10 inches tall with perforated outer wall and an axially disposed perforated core 2 inches in diameter, and contained about 108 ounces of the product of Example I. The direction of flow was radially outward from the central core space. The working pressure of the airplane engine on which it was tested was 20 pounds gauge, and the rate of flow was 2 gallons per minute. The test run lasted 75 hours, in three periods of 25 hours each, in the first of which the filter was connected into the recirculatory system, in the second the filter was disconnected, and in the third the filter was connected into the recirculatory system. At the start of the test the lubricating oil was "new" but had flushed some residual sludge (0.12% by weight) from the engine parts. The filter quickly removed residual sludge from the circulated oil to a 0.02% content, and held the sludge content at between 0.02% and 0.05% for the first 25 hour run. At the end of the second 25 hour run the sludge content of the oil had increased to 0.30%. In the third 25 hour run the filter unit decreased the sludge content of the circulated oil to, and held the same, not to exceed 0.06% by weight until the end of the run.

It will be appreciated that since the oil was continuously generating sludge, it necessarily showed, at best, a certain minimum sludge content equivalent to, say, 0.02–0.03% by weight. It is to be appreciated also, that use of the filter unit maintained the sludge content of the oil at a value well below that critical point (in this instance, a calculated value of 0.15%) at which sludge would have begun to aggregate and to exercise its carbon-building, and other ill effects.

We claim:

1. Process for producing a filtering mass, which comprises impregnating bodies of loosely associated cellulosic fibers with a solution consisting essentially of sodium silicate, while continuously loosening and mixing the bodies during gradual application thereto of the impregnating solution, thereafter adding the impregnated bodies to a body of a solution of a chemical adapted to react with the impregnating solution to precipitate in and among the fibers of said impregnated bodies a porous stiffening agent comprising silica gel, the reactants being proportioned to insure the complete neutrality of the silica gel so precipitated, maintaining the so-treated bodies in contact with the solution of reactive chemical until the silica gel has formed, and thereafter separating the so-treated bodies from the solution, washing them with water and thermally conditioning them.

2. Process for improving the filtering properties of cellulose wadding cuttings which comprises impregnating the cuttings with a solution of sodium silicate, while continuously loosening and mixing the cuttings during gradual application thereto of the impregnating solution, thereafter adding the impregnated cuttings to a body of a solution of mineral acid, the acid content of said solution being adapted completely to react with all the sodium silicate in the cuttings to precipitate neutral adsorbent silica gel in and among the fibers of the cuttings, maintaining the cuttings in contact with the latter solution until the silica gel has formed, separating the cuttings from the latter solution and washing them with water, and thermally conditioning the washed cuttings.

3. A filtering medium for use in the filtration of lubricating oils, which comprises a resilient assemblage of a multitude of relatively thin and narrow, promiscuously arranged disconnected worm-like bodies, said bodies being comprised of loosely associated cellulosic fibers, each of said worm-like bodies containing a siliceous adsorbent stiffening agent dispersed among the fibers thereof and tenaciously adhering to the surfaces of the latter, the silicon content of said stiffening agent consisting of structurally porous neutral adsorbent silica gel, said resilient assemblage being compacted to a bulk density providing not more than a relatively small drop in the pressure maintained on said circulated lubricating oil consistent with free flow of the latter through the interstices among the compacted bodies constituting said resilient assemblage.

4. A filtering medium for use in the filtration of oils, which comprises a resilient assemblage of a multitude of relatively thin and narrow, promiscuously arranged disconnected worm-like bodies, said bodies being comprised of loosely associated cellulosic fibers, each of said worm-like bodies containing a siliceous adsorbent stiffening agent dispersed among the fibers thereof and tenaciously adhering to the surfaces of the latter, the silicon content of said stiffening agent consisting of structurally porous neutral adsorbent silica gel in an amount corresponding to from about 30% to about 75% by weight of the dry weight of said assemblage, said resilient assemblage being compacted to a bulk weight of from 0.12 to 0.24 ounce per cubic inch and having macroscopic tortuous interstices among the bodies constituting said assemblage for free flow of oil therethrough.

5. A filter unit adapted to be installed in a filter casing of a recirculating lubricating oil system of an internal combustion engine which system includes an oil pump, a pressure oil line, a casing of an oil filter interposed in the pressure oil line, and a return oil line from the filter, said filter unit comprising a container having imperforate top and bottom, a foraminous peripheral wall and a foraminous central core defining a central open space for introduction of oil from the pressure oil line, said foraminous peripheral wall, foraminous core, imperforate top and imperforate bottom defining therebetween a space filled with a resilient assemblage of a multitude of relatively thin and narrow, promiscuously arranged, disconnected worm-like bodies, said bodies being comprised of loosely associated cellulosic fibers, each of said worm-like bodies containing a siliceous adsorbent stiffening agent dispersed among the fibers thereof and tenaciously adhering to the surfaces of the latter, the silicon content of said stiffening agent consisting of structurally porous neutral adsorbent silica gel in an amount corresponding to from about 30% to about 75% by weight of the dry weight of the assemblage, the degree of compaction of the assemblage being such as to provide macroscopic tortuous interstices among the bodies constituting said assemblage for free flow of oil under pressure radially outwardly from said core space through said assemblage interstices and to said return line and equivalent to a density of from 0.12 ounce to 0.24 ounce per cubic inch of said assemblage.

CHESTER G. GILBERT.
GEOFFREY GILBERT.